United States Patent
Dischler (10) Patent No.: US 6,533,152 B1
(45) Date of Patent: Mar. 18, 2003

(54) TRAVEL BAG WITH SHELVING INSERT ADAPTABLE FOR MOTORCYCLE TRANSPORTATION

(76) Inventor: Gregory Jude Dischler, 801 Sand Creek Dr., Bakersfield, CA (US) 93312

( * ) Notice: Subject to any disclaimer, the term of this patent is extended or adjusted under 35 U.S.C. 154(b) by 0 days.

(21) Appl. No.: 09/717,501

(22) Filed: Nov. 20, 2000

(51) Int. Cl.$^7$ .................................................. B62J 7/00
(52) U.S. Cl. ........................ 224/413; 224/427; 224/652; 224/653; 224/680; 224/681; 190/9; 220/9.1
(58) Field of Search ................................ 224/413, 427, 224/680, 681, 682, 683, 684, 652, 653; 312/3; 190/9; 220/9.1

(56) References Cited

U.S. PATENT DOCUMENTS

| | | | |
|---|---|---|---|
| 2,517,757 A | * 8/1950 | Adlerstein ...................... 190/9 |
| 4,003,508 A | * 1/1977 | Hoops ........................ 224/148 |
| D249,036 S | * 8/1978 | Ramalia et al. ............. D12/409 |
| 4,125,213 A | 11/1978 | Watkins |
| 4,303,184 A | 12/1981 | Kloth |
| 4,442,960 A | 4/1984 | Vetter |
| 4,809,891 A | * 3/1989 | Patrin .......................... 224/413 |
| 4,934,571 A | 6/1990 | Shimazaki |
| 4,941,603 A | * 7/1990 | Creamer et al. ............. 150/109 |
| 5,025,883 A | 6/1991 | Morinaka |
| 5,042,664 A | * 8/1991 | Shyr et al. ................... 190/109 |
| 5,405,068 A | * 4/1995 | Lovett ......................... 224/153 |
| 5,988,476 A | * 11/1999 | Olerio ......................... 108/107 |
| 6,029,875 A | * 2/2000 | Johnston ...................... 224/153 |
| 6,123,239 A | * 9/2000 | Lovitt ......................... 190/103 |
| 6,299,042 B1 | * 10/2001 | Smith .......................... 224/413 |

* cited by examiner

Primary Examiner—Stephen K. Cronin
(74) Attorney, Agent, or Firm—James M. Duncan (57) ABSTRACT

A motorcycle travel bag comprising a shell and a shelving insert, wherein the shelving insert provides a convenient and secure apparatus for organizing, storing and transporting various items on a motorcycle. Items may be stored on the shelves of the shelving insert or in various pockets which may be attached to the exterior of the shell.

3 Claims, 11 Drawing Sheets

TRAVEL BAG WITH SHELVING INSERT ADAPTABLE FOR MOTORCYCLE TRANSPORTATION

BACKGROUND

The present invention generally relates to the area of luggage options for motorcycles. Specifically, this invention relates to luggage which may readily be fastened to a motorcycle, the luggage having internal shelves, thus providing ease, convenience, and organization for the rider and/or passenger in transporting their belongings by motorcycle.

Limited space is available on motorcycles for a rider and the rider's passenger to carry their belongings. Some motorcycles may come equipped with large capacity saddlebags or panniers hanging down on either side of the rear wheel, as shown in U.S. Pat. No. 4,442,960 (Vetter). However, such luggage can be expensive, difficult to remove from the motorcycle, and too bulky to easily hand carry when the rider wishes to carry his or her belongings into a motel, campsite or other lodging. Moreover, some motorcycle riders feel such luggage is unsightly on their motorcycles and creates additional surface area for wind resistance.

Because of the disadvantages of mounting motorcycle luggage on either side of the wheel, U.S. Pat. No. 5,405,068 (Lovett) proposes a bag supported by either the motorcycle seat member or by a rack structure. An object of the bag in the '068 patent is to overcome the disadvantages of the saddlebags or panniers by providing a travel bag which can be easily attached and removed from the motorcycle. This bag is secured to the motorcycle through the use of a pocket on the front of the bag, where the pocket is sized to fit snugly over the rear passenger seat back or sissy bar. The pocket is located on the bag so that the bottom of the bag will just rest on the luggage rack when the seat back is completely inserted into the pocket. However, careful construction of the pocket is central to the successful operation of this bag. The pocket must be so constructed that the internal volume of the pocket is less than this bag. The pocket must be so constructed that the internal volume of the pocket is less than the volume of the padded seat back, because the pocket must partially compress the resilient material of the seat back for the bag to be securely attached to the motorcycle. Because the rear seat back varies in dimensions from model to model of motorcycle, it is necessary to specifically size the pocket and the rest of the bag for each particular model of motorcycle.

Another disadvantage of fabric bags, which have no internal reinforcement members, is that the bag must be completely filled, because a loosely filled bag will vibrate and flap when the motorcycle is in motion. The bag disclosed in the '0068 patent partially solves this problem through the use of a zippered gusset that allows the travel bag to expand as extra space is required. However, depending upon the volume of items to be stored in the bag, if the bag disclosed in the '0068 patent is only partially filled, with the zippered gusset closed, excess fabric may still vibrate and flap.

A feature common to most previous motorcycle luggage, including saddlebags, panniers, and the bag disclosed by the '0068 patent, is that the main storage space defined by each of these devices is merely a large enclosure with minimal internal structure for organizing the user's belongings. The user fills the enclosure with his or her belongings from the bottom of the luggage device until the luggage is fully loaded. However, because there is no internal structure, items packed within the enclosure may shift during travel, with smaller or heavier items working to the bottom of the enclosure. Although the user, desiring to have ready access to certain items, may pack these items at the top of the enclosure, it may be necessary to completely empty the bag in order to locate the items because they may have shifted to the bottom of the enclosure during travel.

The lack of internal storage structure in existing motorcycle luggage also results in clothing items becoming crumpled and wrinkled from shifting of the packed items. Clothing items which were neatly pressed when placed within the luggage become wrinkled because there is no internal structure for supporting and protecting clothing from being crumpled inside the luggage.

SUMMARY OF THE INVENTION

The present invention is a travel bag adaptable for motorcycle transportation. The invention is comprised of a shell, a shelving insert contained within the shell, and securing members for securing the travel bag to a motorcycle. The shell is opened by operating fasteners allowing access to the shelving insert and the inside of the shell. The shelving insert has a top shelf, bottom shelf, two side pieces and a plurality of intermediate shelves, and may have a back piece. The travel bag provides a convenient and secure apparatus for organizing, storing and transporting clothing, helmets, gloves, toiletries, shoes, camping equipment, tools and other items on the back of a motorcycle. Items may be stored on the shelves of the shelving insert or in various pockets which may be attached to the exterior of the shell. The travel bag maintains the organization of the goods packed by the user, allowing the user ready access to specific desired items without the user having to unpack all of the contents of the bag. This invention allows the user to pack and transport neatly pressed clothing items, without the clothing items becoming excessively wrinkled or disorganized. This invention provides internal reinforcement to a fabric travel bag so that a partially-filled travel bag will not vibrate or flap excessively when the motorcycle is in motion. This bag may be secured to the motorcycle without the need to size the mechanism for the particular model of motorcycle. Rollers or wheels may be mounted on the bottom of the travel bag allowing for easy transportation of the device after it has been removed from the motorcycle.

DETAILED DESCRIPTION OF THE PREFERRED EMBODIMENTS

The present invention comprises a travel bag with shelving insert adaptable for motorcycle transportation. The invention is comprised of two major components, the first component being a heavyweight fabric shell 10, which may be constructed of a durable, water-resistant, and flexible material, such as CORDURA. The shell 10 provides an enclosure for the second major component, a shelving insert 38. The shelving insert 38 may be constructed of lightweight rigid materials, such as plastic, aluminum, fiberglass, wood and/or composite materials.

Figure 6:
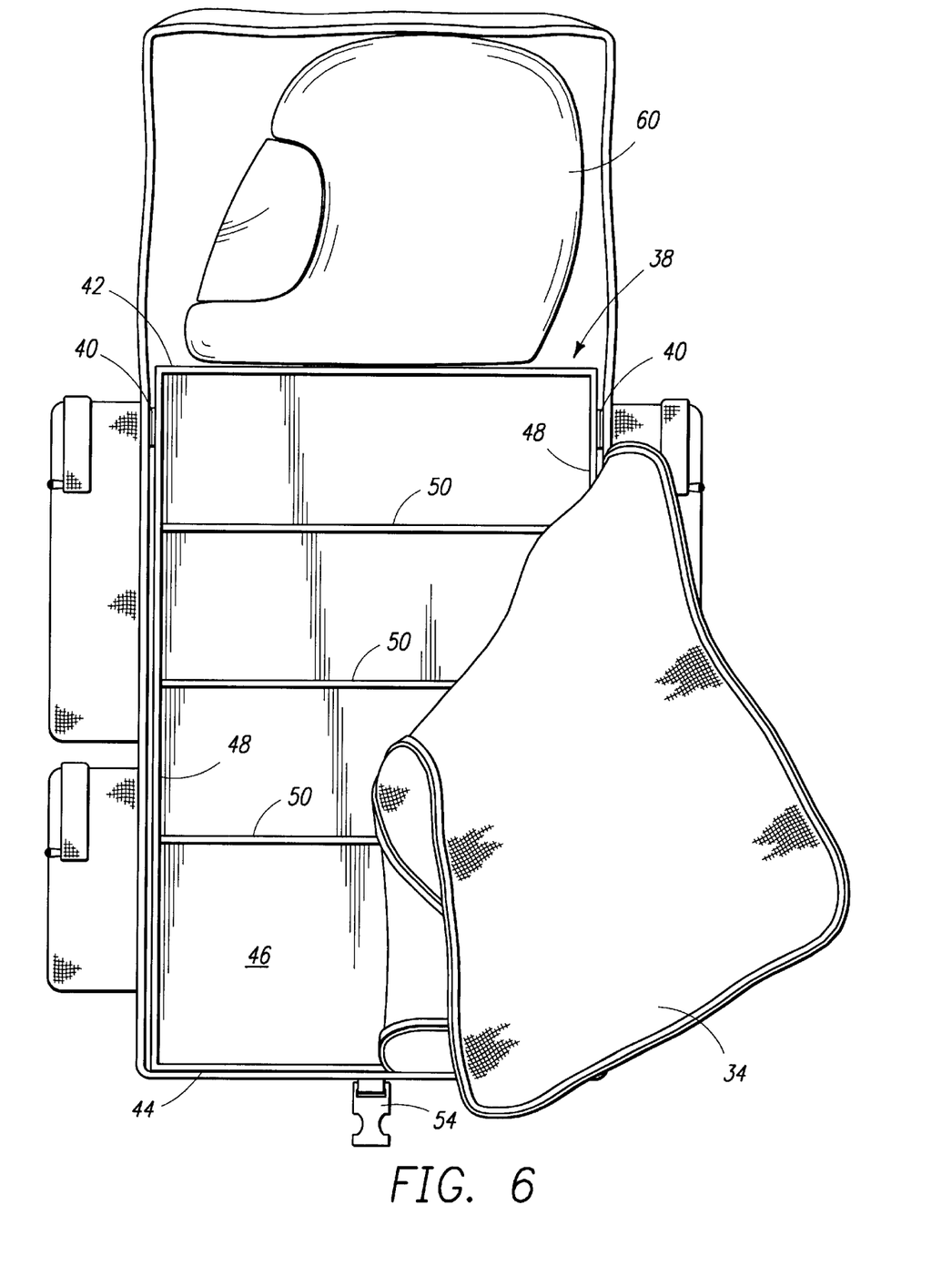
FIG. 6 shows a front elevational view of the subject invention, with the flap unfastened, showing how a helmet or other bulky items may be stored.
Figure 7:
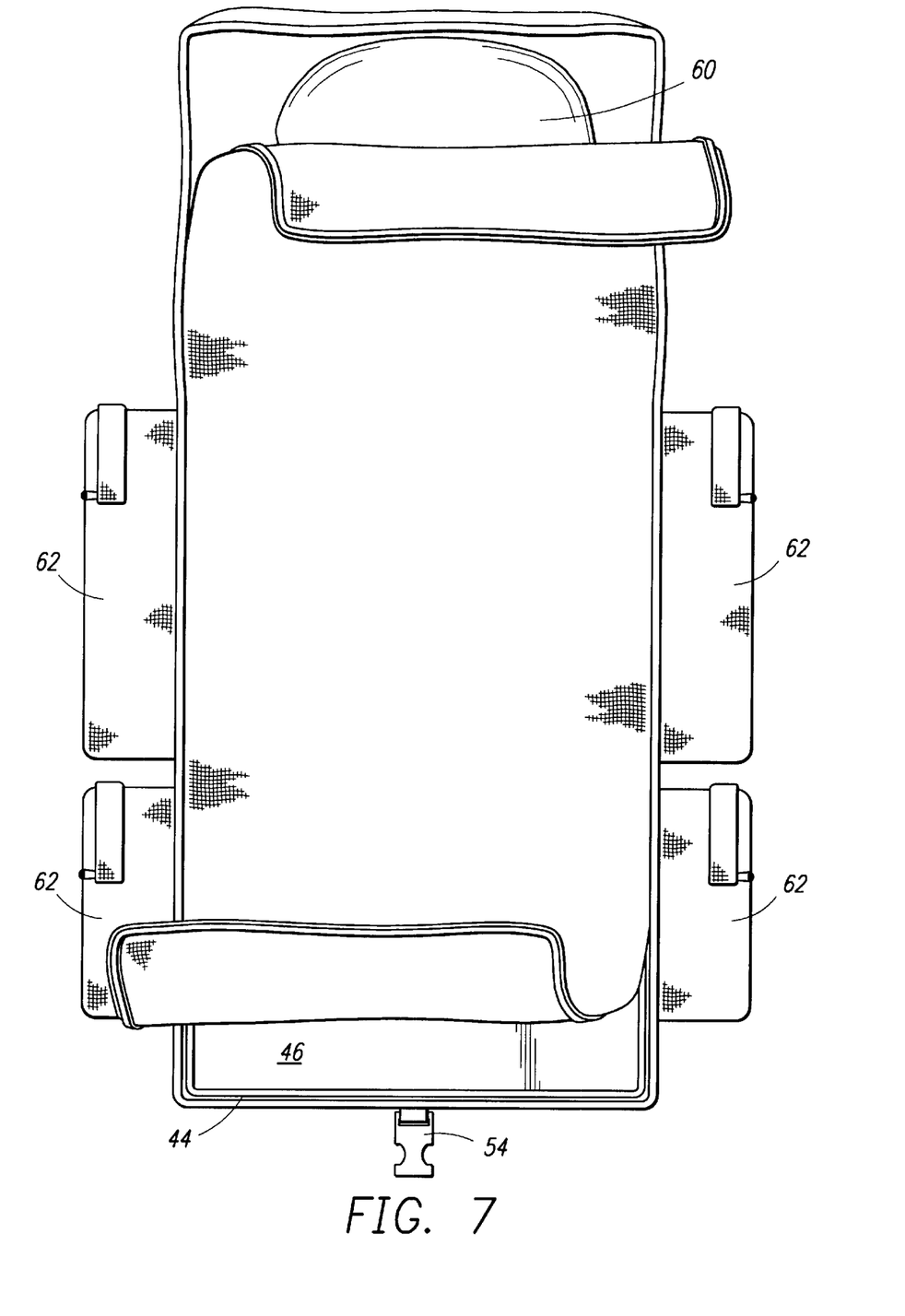
FIG. 7 shows a front elevational view of the subject invention, showing how the shell may be opened from either the top or the bottom.
Figure 8:
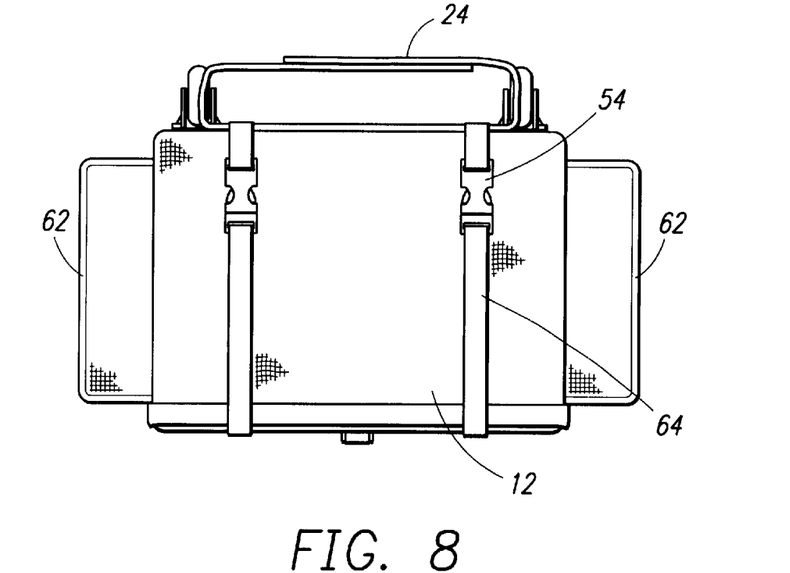
FIG. 8 shows a top view of the subject invention.
Figure 9:
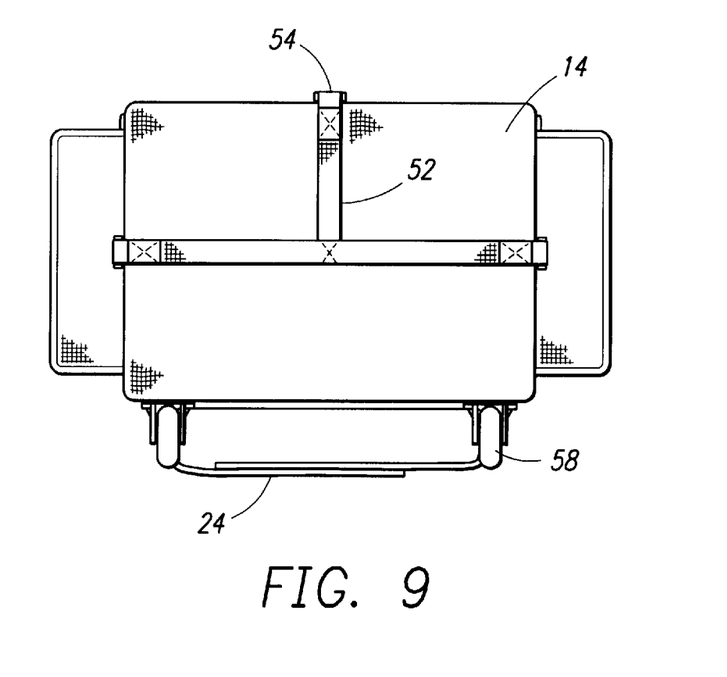
FIG. 9 shows a bottom view of the subject invention.

Although other shapes are possible, in one embodiment the fabric shell 10 is comprised of a top surface 12, a bottom surface 14, a rear surface 16, a front surface 18, and two side surfaces 20, which are joined together in approximately a rectangular prism. Access to the inside of the fabric shell is allowed by activating shell fasteners 36 which may be installed at the seam 32 joining the front surface 18 to the side surfaces 20. When the shell fasteners 36 are opened, a flap 34 is formed, such as shown in FIG. 6. As shown in FIG. 7, access to particular portions of the shelving insert 38 is allowed while leaving the flap 34 closed over other portions of the shelving insert to protect items from rain or moisture.

Additional components of the fabric shell 10 of the travel bag are security flaps 24, attached to the rear surface 16, mounting straps 52, and corresponding quick clip connectors 54. A handle strap 56, mounted rollers 58 and side pockets 62 may also be attached to the fabric shell 10.

The shelving insert 38 is comprised of a top shelf 42, bottom shelf 44, side pieces 48, and intermediate shelves 50. A back piece 46 may be connected to the back edges of the top shelf 42, bottom shelf 44, side pieces 48 and intermediate shelves 50. The shelving insert 38 may be held within the fabric shell 10 by various insert fasteners 40 such as screws, adhesives, tacks, or hook and loop fasteners, sold under the registered trademark, "Velcro." If used, hook and loop fasteners may be attached to the inside surfaces of the shell 10 by various means, such as sewing or adhesives. A corresponding hook and loop fastener is attached to the outside surfaces of the shelving insert 38.

Figure 1:
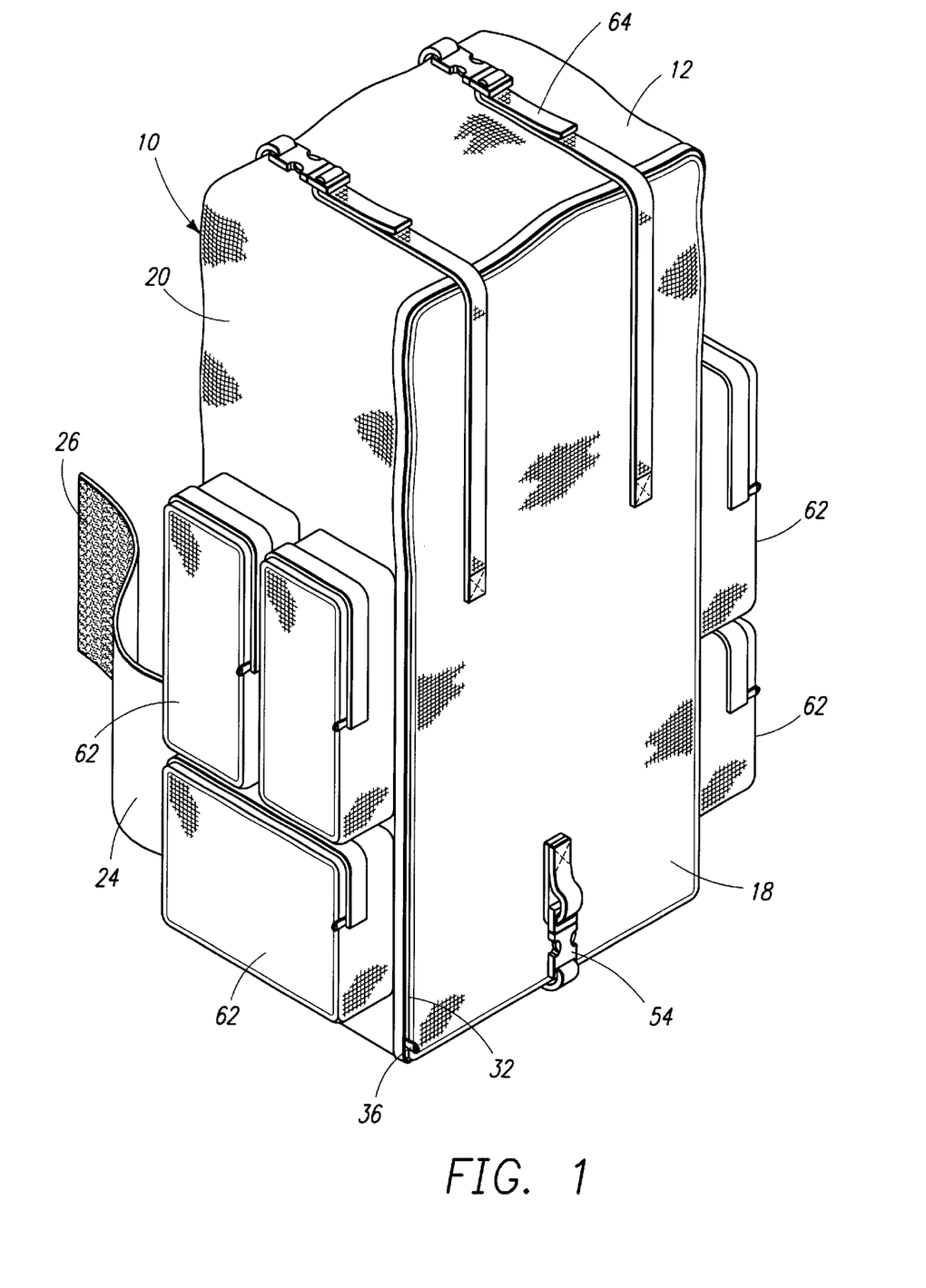
FIG. 1 shows an isometric view of the subject invention.
Figure 2:
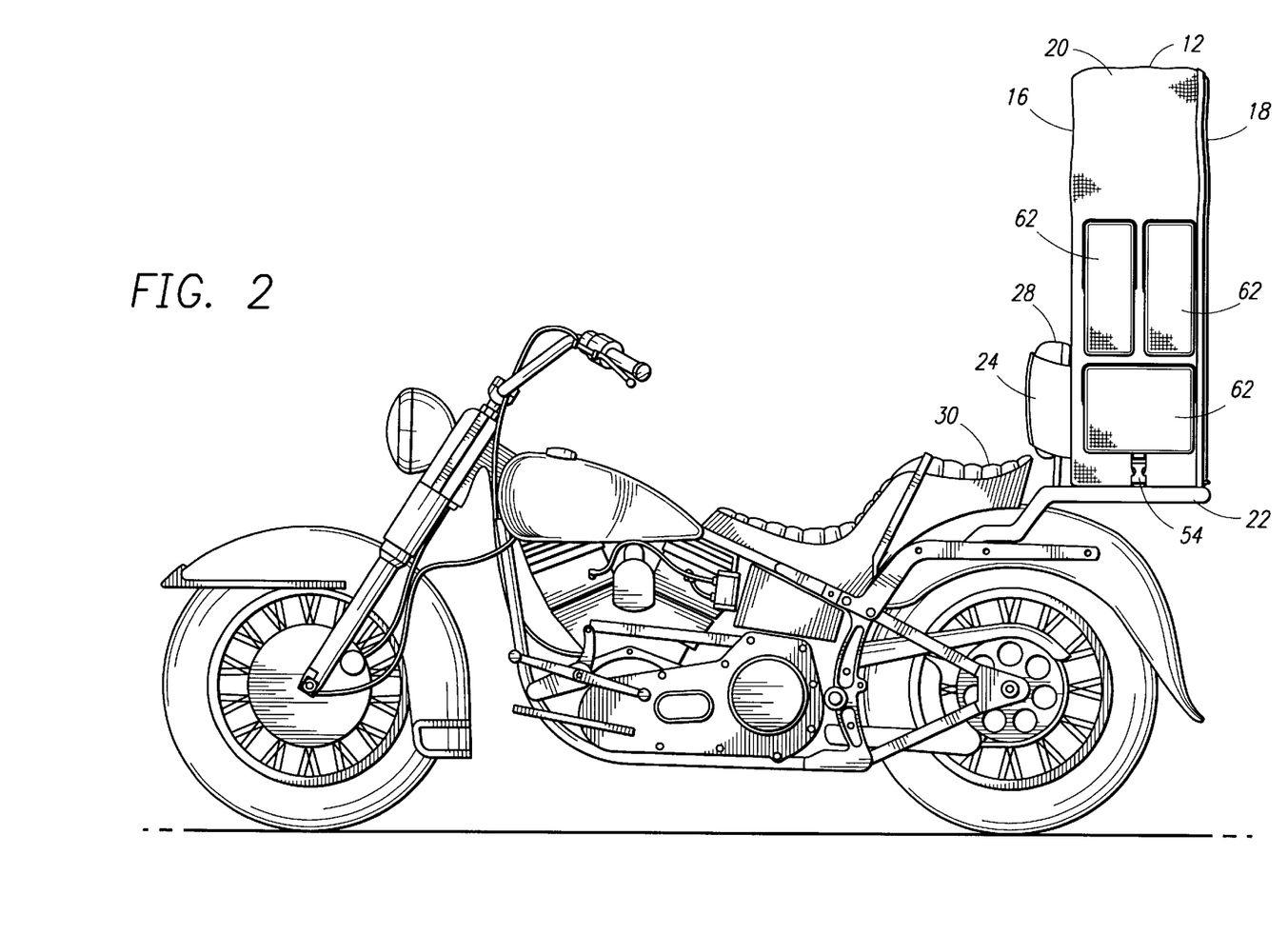
FIG. 2 shows a side elevational view of the subject invention mounted on the luggage rack of a motorcycle.

Different means may be used for securing the travel bag to the motorcycle. The travel bag may be attached to the motorcycle with security flaps 24 attached to the rear surface 16 of the bag, which wrap around the rear passenger seat back 28 of the motorcycle. Hook and loop fasteners 26 are attached to the security flaps 24 in such a manner as to allow the security flap on one side of the rear surface 16 to fasten to the corresponding security flap of the opposite side of the rear surface. With the bottom surface 14 of the travel bag resting on the motorcycle luggage rack 22, as depicted in FIG. 2, the security flaps 24 from each side of the rear surface 16 are wrapped tightly around the rear passenger seat back 28. Unlike pocket devices which must be specifically sized for the dimensions of the specific rear seat back, the security flaps 24 of the present invention are readily adaptable to rear seat backs and sissy bars of different dimensions, by simply adjusting the relative positions of each flap by adjusting the hook and loop fasteners 26 on each security flap.

Another means of securing the travel bag to the motorcycle is with mounting straps 52 and respective quick clip connectors 54 attached to the bottom surface 14 and/or lower sections of the rear surface 16 or front surface 18 of the travel bag. The mounting straps 52, preferably nylon, are wrapped tightly around members of the motorcycle luggage rack 22, with the ends of the mounting straps being secured into the receiving ends of the quick clip connectors 54. Both the security flaps 24 and the mounting straps 52 should be used to secure the travel bag to retain the bag firmly in place during travel.

Figure 3:
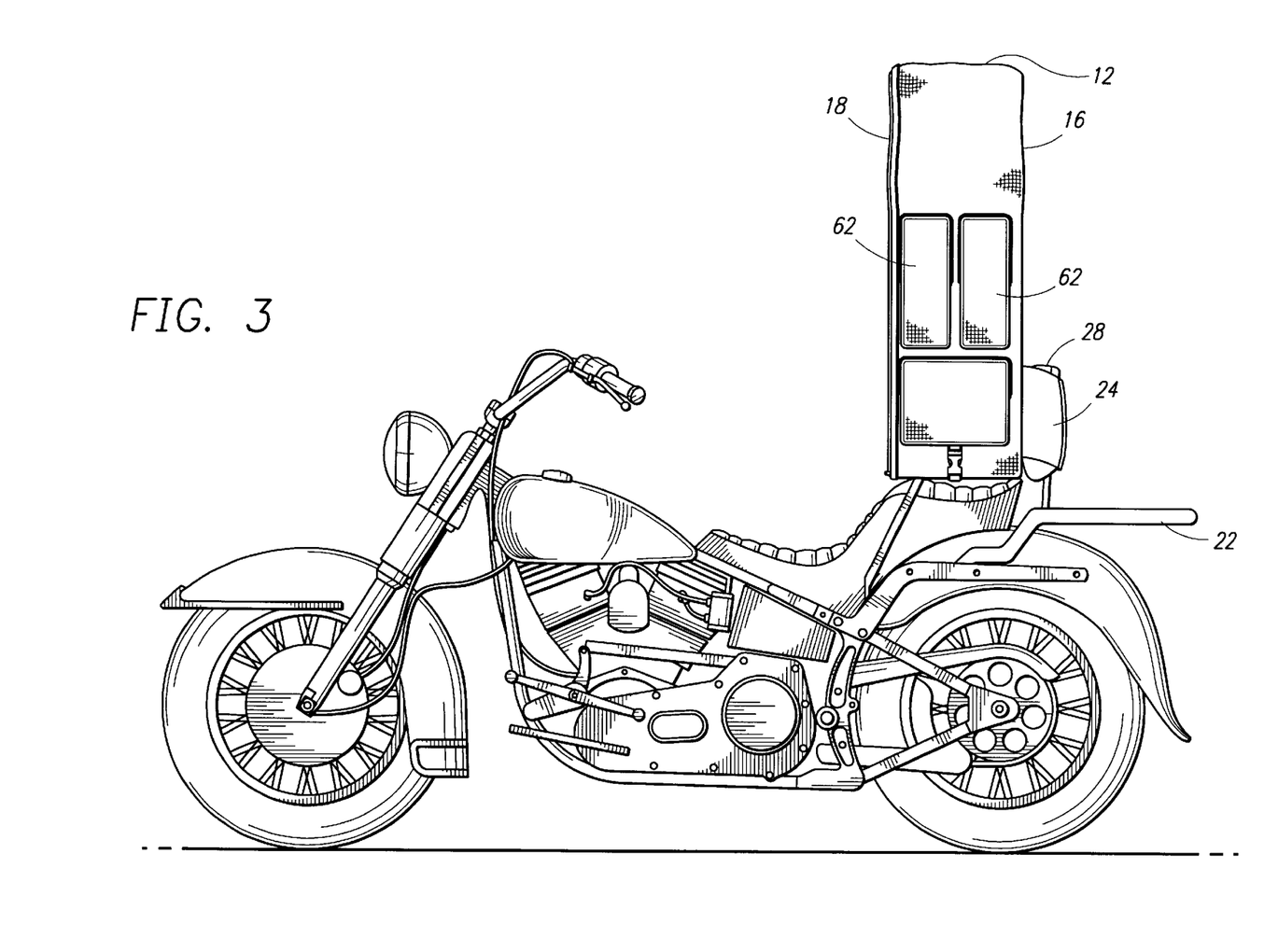
FIG. 3 shows a side elevational view of the subject invention mounted on the passenger seat-of a motorcycle.
Figure 4:
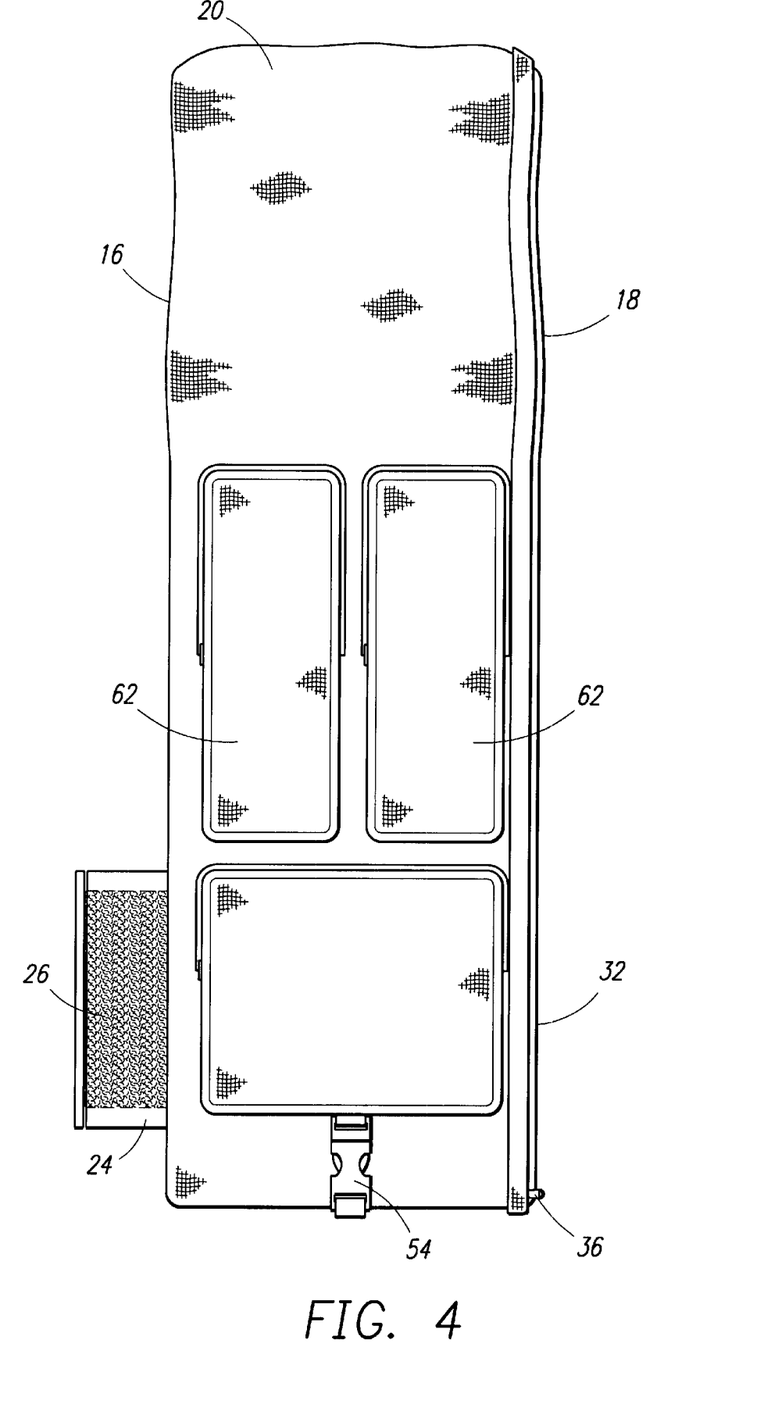
FIG. 4 shows an elevational view of the left side of the subject invention.
Figure 5:
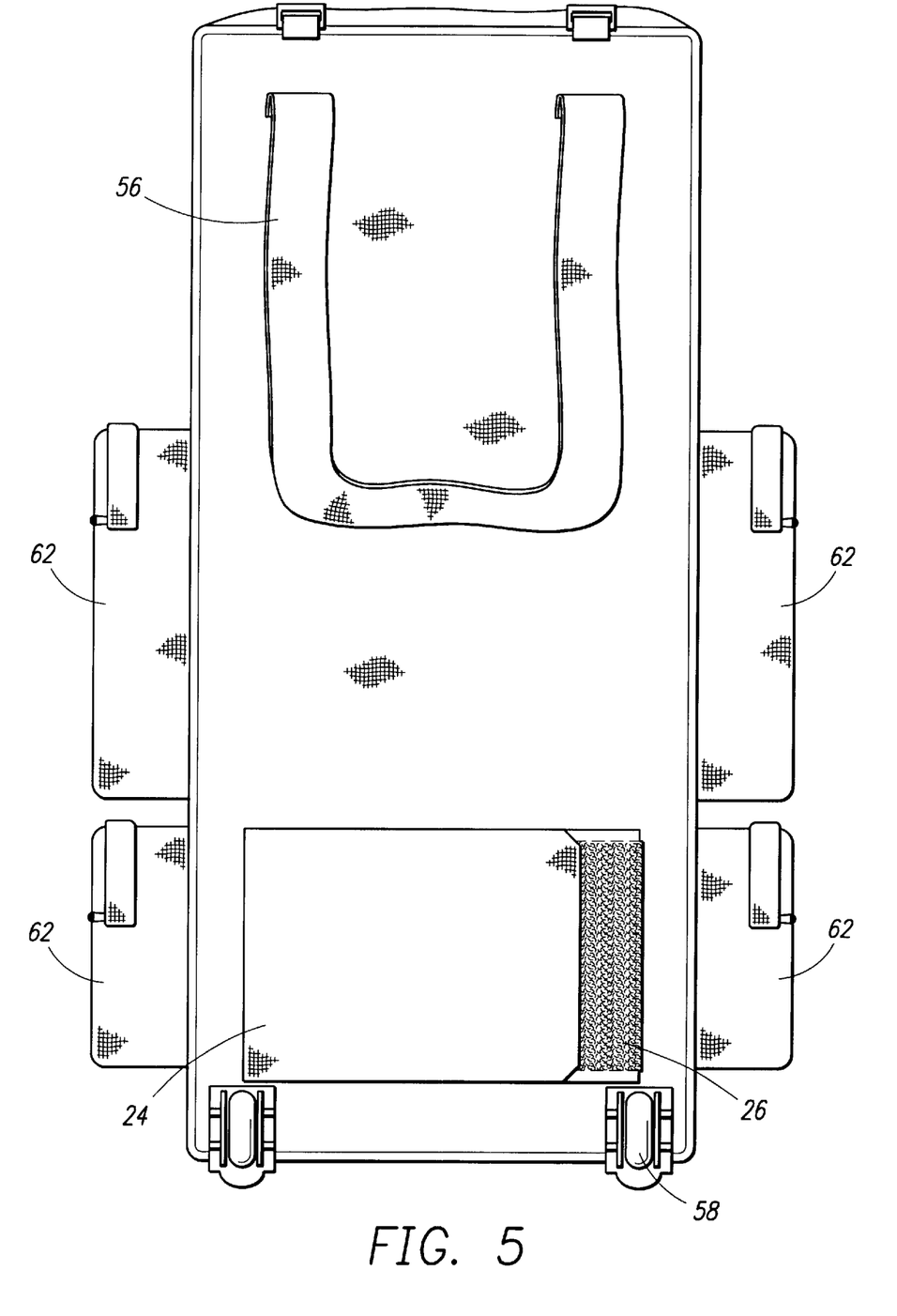
FIG. 5 shows a rear elevational view of the subject invention.

When the travel bag is attached to the motorcycle as depicted in FIG. 2, it has the added benefit of providing additional back support for the rear passenger on the motorcycle. An alternative method of attaching the travel bag is available where only one person is on the motorcycle. The bottom surface 14 of the travel bag may be rested upon the rear passenger seat 30, so that the security flaps 24 are facing toward the rear of the motorcycle as depicted in FIG. 3. Mounting the travel bag in the manner depicted in FIG. 3 provides additional back support for a single person riding the motorcycle. To mount the travel bag to the motorcycle in this manner, the bag is simply turned around so that the rear surface 16 and the security flaps 24 are oriented to face the rear of the motorcycle, toward the rear passenger seat back 28. The mounting straps 52 may then be looped around portions of the motorcycle, such as passenger handrail, with the ends of the mounting straps being secured into the receiving ends of the quick clip connectors 54.

In one embodiment, the travel bag has rollers 58 mounted to either the bottom surface 14, or mounted to the edge of the rear surface 16 adjacent to the bottom surface. The rollers 58 allow the user to roll the bag on the ground after the bag has been dismounted from the motorcycle. The back piece of the shelving insert 46 or and/or the bottom shelf of the shelving insert 44 provide hard surfaces to which the rollers 58 might be attached through the fabric shell 10 by fasteners, such as screws, nails, rivets, or bolts. As an alternative, the rollers 58 may be attached directly to the fabric shell 10. A handle strap 56 for either lifting the travel bag or pulling the bag along on the rollers 58 is attached to either the top surface 12 or the rear surface 16 of the fabric shell 10. Side pockets 62 may be attached to the side surfaces 20 to provide additional storage capacity for the user, which may be sized and located for convenience and the configuration of the particular motorcycle.

In one embodiment of the travel bag, additional storage volume is provided by increasing the height dimension of the fabric shell 10 so that the volume between the top surface of the fabric shell 10 and the top shelf 42 of the shelving insert 38 is sufficiently enlarged to allow for the storage of larger items inside the travel bag, resting on the top shelf. For example, as depicted in FIG. 6, this space may be used for storage of motorcycle helmets 60. When this storage volume is not required, the excess fabric may be folded over against the top self of the shelving insert 42 and secured by the top straps 64 to prevent the extra fabric from vibrating or flapping during operation of the motorcycle.

Figure 10:
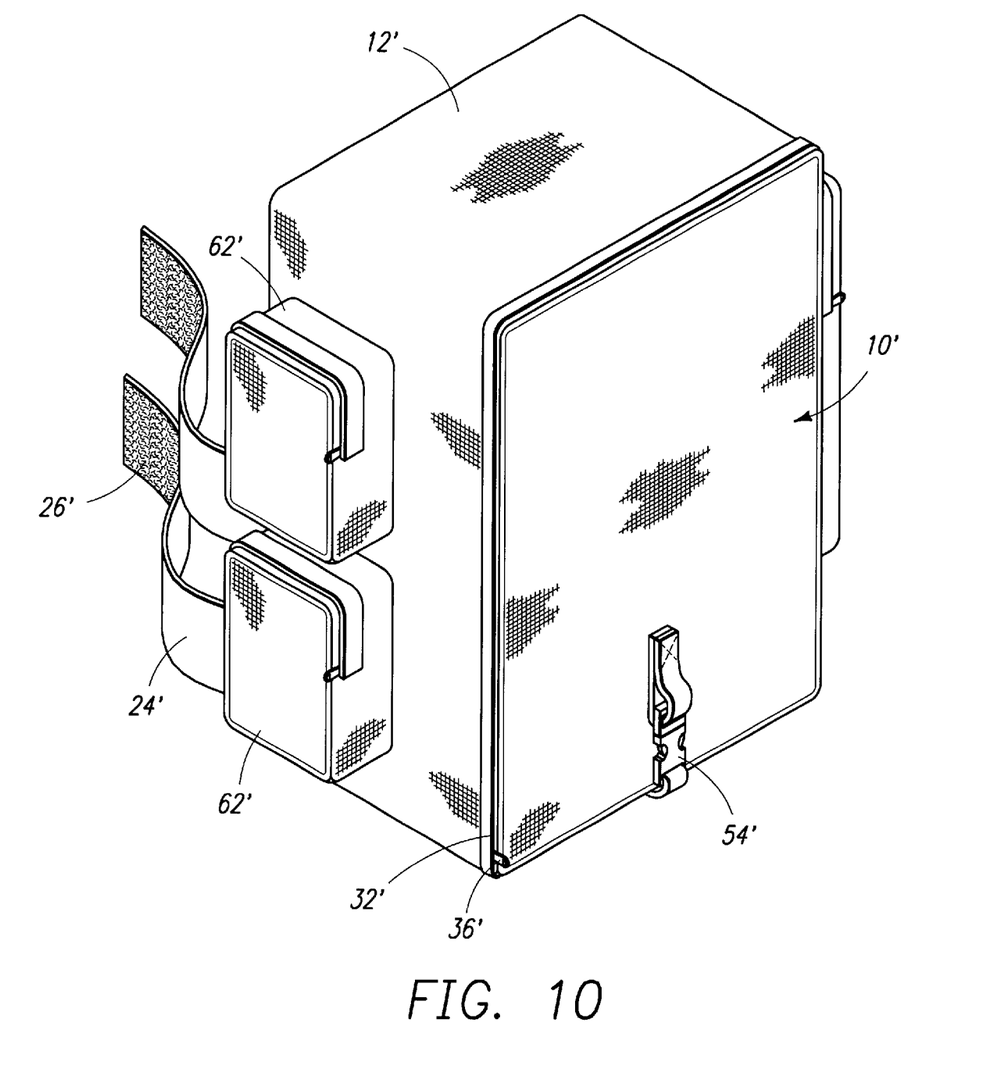
FIG. 10 shows an isometric view of an alternative embodiment of the subject invention.
Figure 11:
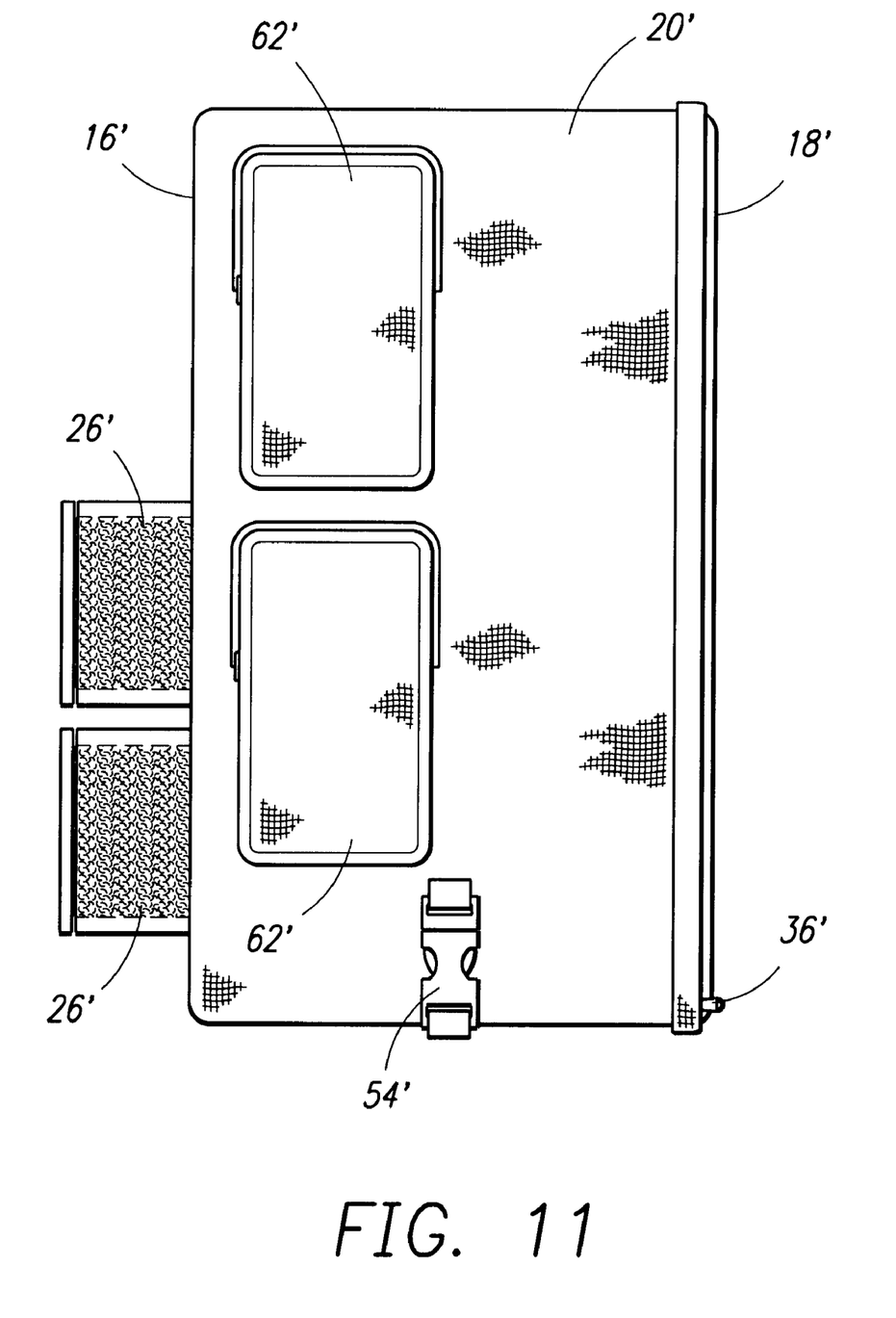
FIG. 11 shows a left side elevational view of an alternative embodiment of the subject invention.
Figure 12:
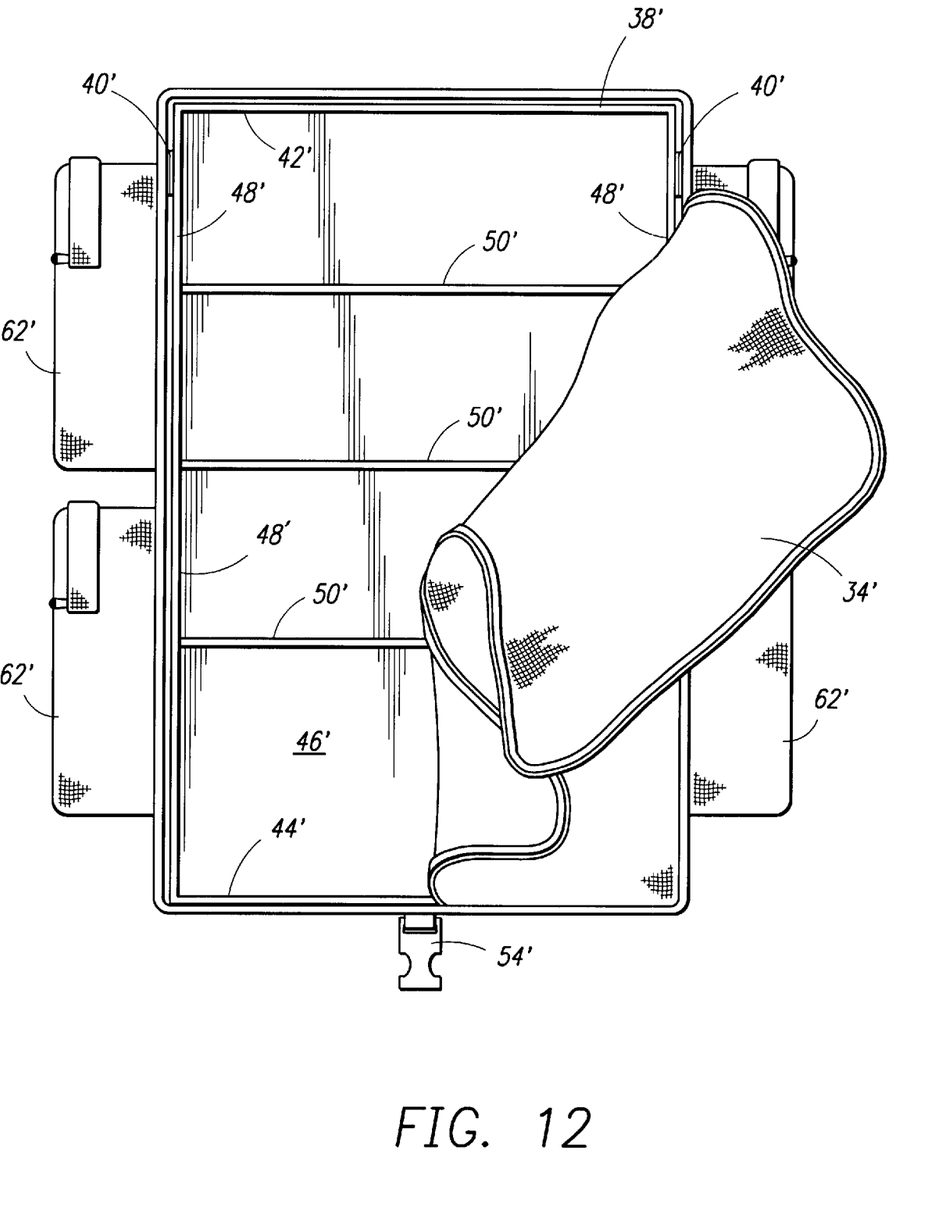
FIG. 12 shows a front elevational view of an alternative embodiment with the flap unfastened.

In another embodiment of the travel bag, shown in FIGS. 10 through 12, the top surface 12' fits tightly over the top shelf 42' of the shelving insert 38', so there is no available storage volume above the top shelf. Although this embodiment has less storage capacity, the travel bag has a streamlined appearance which may be preferred by some users. This embodiment shares the same features as the first embodiment, such as security flaps 24' attached to the rear surface 16', a front surface 18', and two side surfaces 20', which are joined together in approximately a rectangular prism. Access to the inside of the shell is allowed by opening shell fastener 36' which may be located at the seam 32'. Flap 34' is formed when shell fastener 36' is opened.

The shelving insert 38' of this embodiment is comprised of a top shelf 42', bottom shelf 44', side pieces 48', and intermediate shelves 50'. A back piece 46' may be connected to the back edges of the top shelf 42', bottom shelf 44', side pieces 48' and intermediate shelves 50'. The shelving insert 38' may be held within the fabric shell 10' by various insert fasteners 40' such as screws, adhesives, tacks, or hook and loop fasteners. If used, hook and loop fasteners may be attached to the inside surfaces of the shell 10' by various means, such as sewing or adhesives. A corresponding hook and loop fastener is attached to the outside surfaces of the shelving insert 38'. Other features of this embodiment are similar to those of the embodiment disclosed in FIGS. 1 through 9.

Use of all of the embodiments of the travel bag is simple. With reference to the embodiment disclosed in FIGS. 1 through 9, the user opens the fabric shell 10 by activating shell fasteners 36, and place his or her clothing and belongings on the intermediate shelves 50 and the bottom shelf 44 of the shelving insert 38. For this embodiment, items may also be placed on the top shelf 42. The shell fasteners 36 are activated to close the fabric shell 10. Additional items may be stored inside the side pockets 62. Using the handle strap 56, the user may pull the bag on its rollers 58 to the motorcycle. Lifting the travel bag by the handle strap 56, the user places the bottom surface 14 on the motorcycle luggage rack 22 or the rear passenger seat 30. The mounting straps 52 are run beneath the members of the luggage rack 22 and latched into the quick clip connectors 54, and the ends of the mounting straps pulled to tighten any slack. The security flaps 24 are wrapped around the rear passenger seat back 28 and connected to their opposite member by hook and loop fasteners 26. Any loose straps should be secured to prevent flapping. The user may then proceed with his or her motorcycle travel, and, upon arriving at the user's destination, perform the above steps in opposite order to remove the travel bag and unload the user's belongings.

Although the subject invention has been described and illustrated in detail, those skilled in the art appreciate that various adaptions and modifications of the preferred embodiments can be configured without departing from the spirit and scope of thee invention. Thus the scope of the invention should not be limited by the specific structures disclosed. Instead the true scope of the invention should be determined by the following claims.

What is claimed is:

1. A travel bag adaptable for motorcycle transportation comprising:
   (a) a fabric shell comprising a bottom surface, a top surface, a rear surface, a front surface, and two side surfaces;
   (b) a plurality of zippers for opening and closing the shell;
   (c) a shelving insert contained within said shell, the shelving insert comprising a top shelf, a bottom shelf, a back piece, two side pieces, and a plurality of intermediate shelves;
   (d) mounting straps affixed to the bottom surface;
   (e) a plurality of security flaps affixed to the rear surface;
   (g) rollers affixed to the rear surface;
   (g) side-pockets attached to the side surfaces; and
   (h) a handle strap attached to the rear surface.

2. A travel bag adaptable for motorcycle transportation comprising:
   (a) a fabric shell comprising a bottom surface, a top surface, a rear surface, a front surface, and two side surfaces.
   (b) a plurality of zippers for opening and closing the shell;
   (c) a plurality of security flaps affixed to the rear surface;
   (d) a plurality of mounting straps affixed to the bottom surface;
   (e) a shelving insert contained inside the shell, the shelving insert comprising a top shelf, a bottom shelf, two side pieces, a plurality of intermediate shelves and a back piece; and
   (e) rollers attached to the bottom surface.

3. A travel bag adaptable for motorcycle transportation comprising:
   (a) a fabric shell comprising a bottom surface, a top surface, a rear surface, a front surface, and two side surfaces.
   (b) a plurality of zippers for opening and closing the shell;
   (c) a plurality of security flaps affixed to the rear surface;
   (d) a plurality of mounting straps affixed to the bottom surface;
   (e) a shelving insert contained inside the shell, the shelving insert comprising a top shelf, a bottom shelf, two side pieces, a plurality of intermediate shelves and a back piece; and
   (e) rollers attached to the rear surface.

\* \* \* \* \*